United States Patent [19]

Beltran et al.

[11] Patent Number: 5,182,080
[45] Date of Patent: Jan. 26, 1993

[54] ADVANCED HIGH-TEMPERATURE BRAZING ALLOYS

[75] Inventors: Adrian M. Beltran, Ballston Spa; Charles H. Kreischer, Schenectady, both of N.Y.

[73] Assignee: General Electric Company, Schenectady, N.Y.

[21] Appl. No.: 633,346

[22] Filed: Dec. 27, 1990

[51] Int. Cl.$^5$ ............................................. C22C 19/70
[52] U.S. Cl. ................................ 420/588; 219/146.22; 420/436; 420/439
[58] Field of Search ........................ 420/436, 439, 588; 219/146.22

[56] References Cited

U.S. PATENT DOCUMENTS

| | | | |
|---|---|---|---|
| 1,449,338 | 3/1923 | McCurdy | 420/588 |
| 2,763,547 | 9/1956 | Dyrkacz et al. | 420/436 |
| 3,260,505 | 7/1966 | Ver Snyder | 253/77 |
| 3,271,140 | 9/1966 | Freche et al. | 420/435 |
| 3,276,865 | 10/1966 | Freche et al. | 420/439 |
| 3,355,287 | 11/1967 | Cape | 420/435 |
| 3,366,478 | 1/1968 | Wheaton | 420/436 |
| 3,632,319 | 1/1972 | Hoppin et al. | 29/487 |
| 3,837,838 | 9/1974 | Mohammed | 420/585 |
| 4,058,415 | 11/1977 | Walter | 148/32 |
| 4,124,737 | 11/1978 | Welfla | 428/640 |
| 4,285,459 | 8/1981 | Baladjanian | 228/119 |
| 4,381,944 | 3/1983 | Smith, Jr. et al. | 75/255 |
| 4,396,577 | 8/1983 | Smith, Jr. et al. | 420/580 |
| 4,478,638 | 10/1984 | Smith, Jr. et al. | 75/255 |
| 4,614,296 | 9/1986 | Lesgourgues | 228/194 |
| 4,618,474 | 10/1986 | Ohi et al. | 420/588 |
| 4,705,203 | 11/1987 | McComas | 228/119 |
| 4,830,934 | 5/1989 | Ferrigno et al. | 428/678 |
| 5,066,459 | 11/1991 | Beltran et al. | 420/588 |

FOREIGN PATENT DOCUMENTS

| | | |
|---|---|---|
| 51-110422 | 9/1976 | Japan . |
| 60-224731 | 11/1985 | Japan . |
| 61-183432 | 8/1986 | Japan . |
| 62-146233 | 6/1987 | Japan . |
| 63-162831 | 7/1988 | Japan . |

Primary Examiner—R. Dean
Assistant Examiner—Margery S. Phipps
Attorney, Agent, or Firm—Nixon & Vanderhye

[57] ABSTRACT

A cobalt base, high temperature brazing alloy having a composition, by weight of:

| | |
|---|---|
| Nickel | from about 8.5% to about 12.5% |
| Chromium | from about 24% to about 40% |
| Tungsten | from about 0% to about 9% |
| Carbon | from about 0.03% to about 0.6% |
| Boron | from about 0.01% to about 3.5% |
| Silicon | from about 1.0% to about 11% |
| Manganese | up to about 2% |
| Cobalt | Balance | is provided for use in the repair of Co-base turbine component superalloys.

2 Claims, No Drawings

ADVANCED HIGH-TEMPERATURE BRAZING ALLOYS

BACKGROUND AND SUMMARY OF THE INVENTION

This invention relates to the repair of alloy articles, and more particularly, to brazing alloy compositions used in an activated diffusion healing process utilized to repair gas turbine nozzles with service-induced damage.

There are numerous cobalt based alloys used in both the manufacture and repair of high-temperature operating gas turbine engine components including combustors, turbine vanes, nozzles etc.

Representative examples of cobalt base alloys for the production and/or repair of superalloy articles are disclosed in U.S. Pat. Nos. 4,830,934; 4,614,296; 4,381,944; 4,285,459; 4,058,415; 3,355,287; 3,276,865; 3,271,140; and 4,396,577. Specific known brazing alloy compositions are set forth below in Table I.

During operation of such components under high-temperature operating conditions, various types of damage or deterioration can occur. For example, cracks can result from thermal cycling, foreign object impact, and/or corrosion. It is, of course, well known that the cost of these components is relatively high and therefore, it is more desirable to repair such components than to replace them.

Typically, surface grinding would be used to remove cracks, corrosion or foreign object damage craters.

An alternate method of turbine nozzle repair and refurbishment to conventional gas tungsten arc or plasma arc weld repair techniques involves the in situ vacuum brazing of a brazing filler alloy in a suitably prepared area. An existing state-of-the-art process known as activated diffusion healing (ADH) has been successfully utilized to effect repairs by depositing brazing filter alloys similar to alloys 1 and 2 found in Table I below below. In practice, a 50/50 volume percent mixture of these alloys is used to make deposits up to 75 mils in depth.

though less corrosion resistant due to its somewhat lower Cr content. It is used as a filler to provide good mechanical properties and does not itself melt during the vacuum brazing cycle. Brazing alloy #2, known commercially as D-15, melts, wets, and flows with excellent brazing characteristics but has very poor hot corrosion resistance and is, therefore, not suitable for industrial gas turbine nozzle service. Other state-of-the-art brazing alloys such #3, #4, and #5 in Table I are somewhat more corrosion resistant than D-15 but do not provide optimum brazing or mechanical properties nor maximum corrosion resistance.

The present invention relates to an improved brazing alloy composition for the repair of environmentally-damaged gas turbine parts exposed for long periods of time to corrosive high-temperatures operation. These brazing alloy compositions are specifically adapted for use in an activated diffusion healing process to rebuild, for example, nozzles, by brazing a mixture of the brazing alloy and the base or parent metal of the nozzle in particulate form. Specifically, repair is effected by brazing a deposit containing a mixture of braze alloy and parent alloy powders. The vacuum brazing cycle causes the braze alloy to melt and alloy with the parent alloy powder and the parent substrate surface. A post-braze diffusion heat treatment cycle is then applied to promote further interdiffusion. The mechanical properties of the resultant repaired region nearly approach those of the parent alloy.

The brazing alloys in accordance with this invention are cobalt-base alloys which, relative to existing commercial alloys, have an increased concentration of elements known to provide surface protection via adherent oxide layers, i.e., Chromium (Cr) and Silicon (Si), while minimizing those elements which may have a deleterious effect on corrosion resistance, i.e., Boron (B) and Tungsten (W). Relatively small concentrations of B and/or Si are used to depress the melting point so that the brazing alloy melts before the parent metal.

The principal objective of the invention is therefore to provide brazing alloy compositions which are bal-

TABLE I

BRAZING ALLOY COMPOSITIONS (WEIGHT PERCENT)

| Alloy No. | Identity | Co. | Ni | Cr | W | C | B | Si | Mn | Other |
|---|---|---|---|---|---|---|---|---|---|---|
| 1 | X-40 | Bal. | 10 | 25 | 7.5 | 0.5 | 0.015 | — | — | |
| 2 | D-15 | 10.3 | Bal. | 15.3 | — | — | 2.3 | — | — | 3.5 Al,3.4 Ta |
| 3 | S-57B | Bal. | 10 | 21 | — | 0.05 | 3.3 | 2 | — | 2.5 Al,4.6 Ta,0.2 |
| 4 | Amdry 400 | Bal. | 17 | 19 | 4 | 0.4 | 0.8 | 8 | — | |
| 5 | Amdry 788 | Bal. | 21 | 22 | 14 | 0.05 | 2.0 | 2 | — | 0.03 La |

The brazing alloys of this invention are adapted specifically for use with a known Co-base or parent superalloy substrate material, commercially known as FSX-414, having the following composition, by weight:

| | |
|---|---|
| Ni | 10% |
| Cr | 29% |
| W | 7.5% |
| C | 0.25% |
| B | 0.015% |
| Si | 0.9% |
| Mn | 0.6% |
| Co | Balance |

Referring back to Table I, Alloy #1, known commercially as X-40, is similar in properties to FSX-414, alanced to achieve high temperature strength, ductility and corrosion resistance while displaying conventional braze alloy characteristics of low melting temperatures and good wetting and flowability under conventional vacuum brazing conditions.

Accordingly, in one preferred embodiment of this invention, a brazing alloy is provided which comprises, by weight:

| | |
|---|---|
| Nickel | from about 8.5% to about 12.5% |
| Chromium | from about 24% to about 40% |
| Tungsten | from about 0% to about 9% |
| Carbon | from about 0.03% to about 0.6% |
| Boron | from about 0.01% to about 3.5% |
| Silicon | from about 1.0% to about 11% |
| Manganese | up to about 2% |

| | |
|---|---|
| Cobalt | Balance |

The alloys of this invention are high temperature (1200°–1900° F.) resistant and provide superior mechanical properties as well as oxidation and corrosion resistance in the above temperature range.

Other objects and advantages of the invention will become apparent from the detailed description which follows.

DETAILED DESCRIPTION OF THE INVENTION

The principal objective here is to retain the mechanical and environmental resistance properties of the base or parent alloy, such as the above described FSX-414, while lowering the melting temperature of the brazing alloy (but not the parent alloy) for good brazing characteristics. Thus, the present invention is embodied in Co-base alloys having the following composition range, by weight:

| | |
|---|---|
| Nickel | from about 8.5% to about 12.5% |
| Chromium | from about 24% to about 40% |
| Tungsten | from about 0% to about 9% |
| Carbon | from about 0.03% to about 0.6% |
| Boron | from about 0.01% to about 3.5% |
| Silicon | from about 1.0% about 11% |
| Manganese | up to about 2% |
| Cobalt | Balance |

A first exemplary alloy in accordance with the present invention has the following composition:

| | |
|---|---|
| Nickel | 10% |
| Chromium | 29% |
| Tungsten | 7% |
| Carbon | 0.1% |
| Boron | 2.5% |
| Silicon | 2.5% |
| Manganese | 0.6% |
| Cobalt | Balance |

A secondary exemplary alloy in accordance with the present invention has the following composition:

| | |
|---|---|
| Nickel | 10% |
| Chromium | 29% |
| Tungsten | 3.5% |
| Carbon | 0.1% |
| Boron | 1% |
| Silicon | 7% |
| Manganese | 0.6% |
| Cobalt | Balance |

As noted hereinabove, the alloys of this invention have been formulated with Boron and Silicon as melting point depressants, although the concentration of Boron is preferably minimized in light of its deleterious effect on corrosion resistance. The addition of Boron and/or Silicon is necessary to insure that, during brazing, only the brazing alloy mixture and not the parent alloy will melt.

The above described alloy has been designed to provide maximum compatibility with the commercially available FSX-414 parent metal through the judicious balancing of brazing and mechanical property requirements while at the same time providing corrosion resistance far superior to known brazing alloys.

In use, a mixture of a brazing alloy of this invention and parent alloy powders are vacuum brazed in situ to rebuild turbine nozzles (or other components) with service induced damage. The vacuum brazing causes the braze alloy to melt with the parent alloy powder and parent substrate surface. A conventional post-braze diffusion heat treatment cycle is then applied to promote further interdiffusion as well as the migration of Boron away from the braze region. The effect of Boron on surface corrosion resistance is thus minimized.

The mechanical properties of the repaired region, using the alloys of this invention, approximate those of the parent alloy.

Thus, the brazing alloys of this invention provide superior oxidation and corrosion resistance, and superior mechanical properties over the temperature range of about 1200° to 1900° F., so that the repaired region of the turbine nozzle (or other component) has mechanical properties similar to those of the parent alloy.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cobalt base, high temperature brazing alloy consisting essentially of, by weight:

| | |
|---|---|
| Nickel | 10%; |
| Chromium | 29%; |
| Tungsten | 7%; |
| Carbon | 0.1%; |
| Boron | 2.5%; |
| Silicon | 2.5%; |
| Manganese | 0.6%; |
| Cobalt | Balance |

2. A cobalt base, high temperature brazing alloy consisting essentially of, by weight:

| | |
|---|---|
| Nickel | 10%; |
| Chromium | 29%; |
| Tungsten | 3.5%; |
| Carbon | 0.1%; |
| Boron | 1%; |
| Silicon | 7%; |
| Manganese | 0.6%; |
| Cobalt | Balance |

* * * * *